(12) United States Patent
Druant et al.

(10) Patent No.: US 12,074,506 B2
(45) Date of Patent: Aug. 27, 2024

(54) STACK OF LAMINATIONS FOR A STATOR HAVING COOLING CHANNELS

(71) Applicant: Dana Belgium N.V., Flanders (BE)

(72) Inventors: Joachim Druant, Houthulst (BE); Steven Vanhee, Hooglede (BE)

(73) Assignee: DANA BELGIUM N.V., Bruges (BE)

( * ) Notice: Subject to any disclaimer, the term of this patent is extended or adjusted under 35 U.S.C. 154(b) by 100 days.

(21) Appl. No.: 17/451,614

(22) Filed: Oct. 20, 2021

(65) Prior Publication Data

US 2022/0045576 A1 Feb. 10, 2022

Related U.S. Application Data

(63) Continuation-in-part of application No. 17/015,880, filed on Sep. 9, 2020, now abandoned.

(30) Foreign Application Priority Data

Sep. 11, 2019 (EP) ..................................... 19196661

(51) Int. Cl.
*H02K 9/19* (2006.01)
*H02K 1/20* (2006.01)
(Continued)

(52) U.S. Cl.
CPC .................. *H02K 9/19* (2013.01); *H02K 1/20* (2013.01); *H02K 3/24* (2013.01); *H02K 5/203* (2021.01)

(58) Field of Classification Search
CPC ................................... H02K 1/20; H02K 9/19
(Continued)

(56) References Cited

U.S. PATENT DOCUMENTS 6,727,611 B2 * 4/2004 Bostwick ............... H02K 5/203
310/58
7,009,317 B2 * 3/2006 Cronin ................... H02K 5/203
310/52
(Continued)

FOREIGN PATENT DOCUMENTS

DE 102009009819 A1 * 8/2010 ............... H02K 1/20
DE 102009009819 A1 8/2010
(Continued)

OTHER PUBLICATIONS

Machine translations of DE-102015220691-A1 (Year: 2017).*
(Continued)

*Primary Examiner* — Daniel C Puentes
*Assistant Examiner* — Minki Chang
(74) *Attorney, Agent, or Firm* — McCoy Russell LLP

(57) ABSTRACT

An electric machine system is provided. The system includes a stack of a plurality of stator laminations with at least a portion of the plurality of stator laminations each including a plurality of holes that are arranged radially outward from a plurality of teeth, where the plurality of holes include a first set of holes, a second set of holes, and a third set of holes, where the first, second, and third sets of holes has a different profile and/or area, where the second set of holes are positioned radially inward from the third set of holes; and where a plurality of oil channels are formed by an alignment of holes in adjacent stator laminations in the portion of the plurality of stator laminations.

20 Claims, 8 Drawing Sheets

(51) Int. Cl.
  *H02K 3/24*    (2006.01)
  *H02K 5/20*    (2006.01)
(58) Field of Classification Search
  USPC ........................................ 310/52, 54, 58, 59
  See application file for complete search history.

(56) References Cited

U.S. PATENT DOCUMENTS

| | | |
|---|---|---|
| 8,519,577 B2 | 8/2013 | Stiesdal |
| 2002/0074874 A1 | 6/2002 | Tong et al. |
| 2014/0265666 A1* | 9/2014 | Shoykhet ............... H02K 9/197 |
| | | 310/59 |
| 2018/0123409 A1* | 5/2018 | Rogginger .............. B02C 23/00 |

FOREIGN PATENT DOCUMENTS

| | | | |
|---|---|---|---|
| DE | 102015220691 A1 * | 4/2017 | |
| EP | 0627804 A2 | 12/1994 | |
| WO | 2017161527 A1 | 9/2017 | |

OTHER PUBLICATIONS

Machine translation of DE-102009009819-A1 (Year: 2010).*
European Patent Office, Extended European Search Report Issued in Application No. 19196661.3, Mar. 12, 2020, Germany, 7 pages.

* cited by examiner

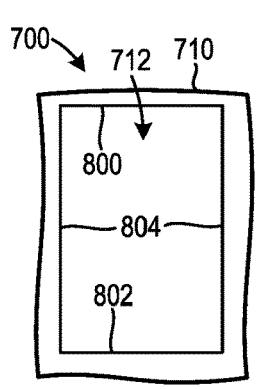 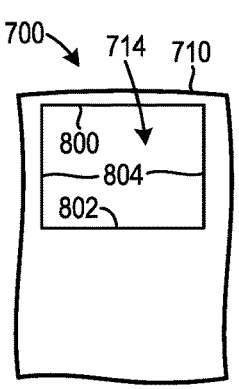 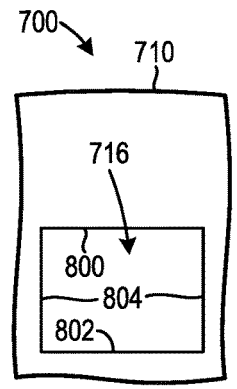
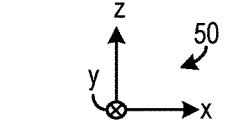 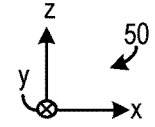 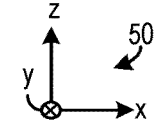
FIG. 8A      FIG. 8B      FIG. 8C
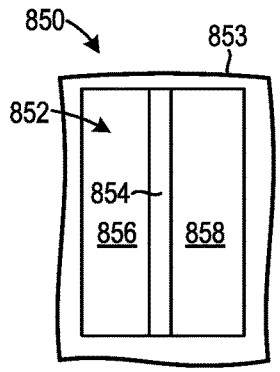 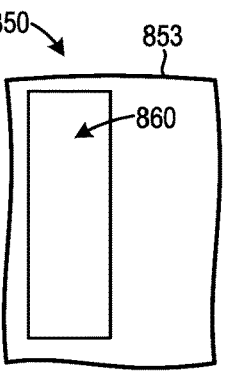 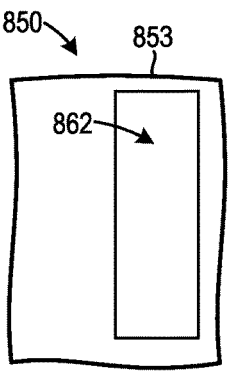
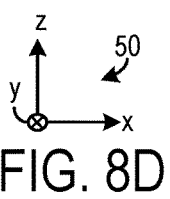 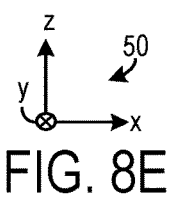 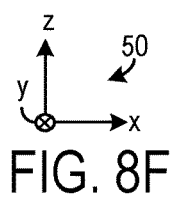
FIG. 8D      FIG. 8E      FIG. 8F
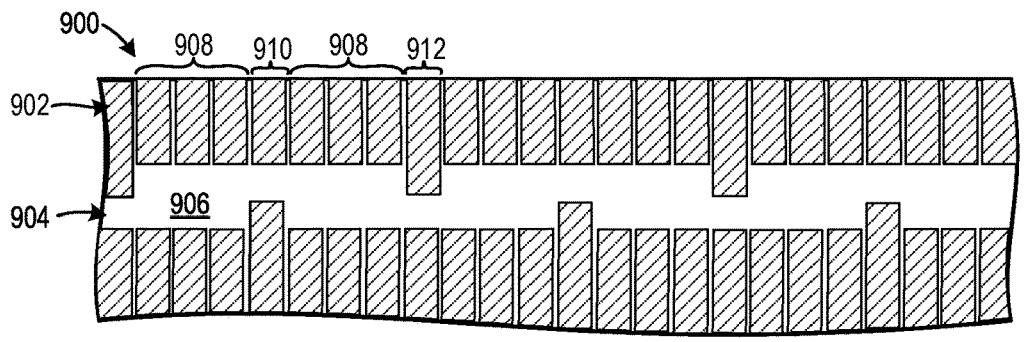
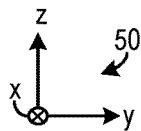
FIG. 9

STACK OF LAMINATIONS FOR A STATOR HAVING COOLING CHANNELS

CROSS-REFERENCE TO RELATED APPLICATIONS

The present application is a continuation-in-part of U.S. patent application Ser. No. 17/015,880, entitled "STACK OF LAMINATIONS FOR A STATOR HAVING COOLING CHANNELS," and filed on Sep. 9, 2020. U.S. patent application Ser. No. 17/015,880 claims priority to European Patent Application No. 19196661.3, entitled "STACK OF LAMINATIONS FOR A STATOR HAVING COOLING CHANNELS", and filed on Sep. 11, 2019. The entire contents of the above-listed applications are hereby incorporated by reference for all purposes.

TECHNICAL FIELD

The present disclosure relates to an electric motor cooling system. The cooling system includes multiple cooling channels in a stack of stator laminations.

BACKGROUND AND SUMMARY

Electric motors conventionally include a stator and a rotor which is rotatably mounted with respect to the stator. In some motors, by energizing windings of the stator with an alternating current the rotor starts rotating. However, the current that energizes the end windings may cause an over-temperature condition in the stator, which may lead to degradation of insulation, thermal distortion of the machine, and diminished motor efficiency.

Attempts have been made to cool stators using water jackets that surround the motor housing but these water jackets may not provide a desired amount of cooling in certain motors, during operating conditions. Other previous systems have endeavoured to route oil directly through the stator, but these systems may exhibit laminar oil flow or lack enough turbulent flow to achieve a desired amount of stator cooling.

To overcome at least a portion of the aforementioned challenges the inventors have developed an electric machine system. The system includes a stack of multiple stator laminations with at least a portion of the stator laminations each including multiple holes arranged radially outward from multiple teeth. The holes in each lamination include a first set of holes, a second set of holes, and a third set of holes. Each of the sets of holes have a different profile and/or area in relation to one another. The second set of holes are positioned radially inward with respect to the third set of holes. Further, in the system, multiple oil channels are formed by an alignment of holes in adjacent stator laminations in the portion of the stator laminations with the holes. In this way, complex flow pattern may be achieved which generates a desired amount of turbulent flow, and effectively cools the stator, thereby increasing motor efficiency.

In one example, the portion of stator laminations that includes the multiple holes may be identical in shape and size. Further, in such an example, sequential stator laminations in the portion of stator laminations are rotated with respect to one another. Additionally, the sequential laminations may be rotated such that the first set of holes in a first stator lamination overlaps with the second or third set of holes in a second stator lamination. In this way, stator laminations with similar contours may be effectively aligned to generate a targeted amount of turbulence in the oil channels. Motor efficiency can be further increased, as a result.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Further features, properties and advantages of the present disclosure will become clear from the following description of embodiments in conjunction with the accompanying drawings. The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIGS. 8A-8F show detailed views of different lamination hole types.

FIG. 9 shows an example of a stator lamination stack.

FIGS. 2-3 and 4-5 may include components in proportional size with one another, according to some embodiments. FIGS. 6A-7 are drawn approximately to scale. However, alternate component dimensions may be used, in other embodiments.

DETAILED DESCRIPTION

Figure 1:
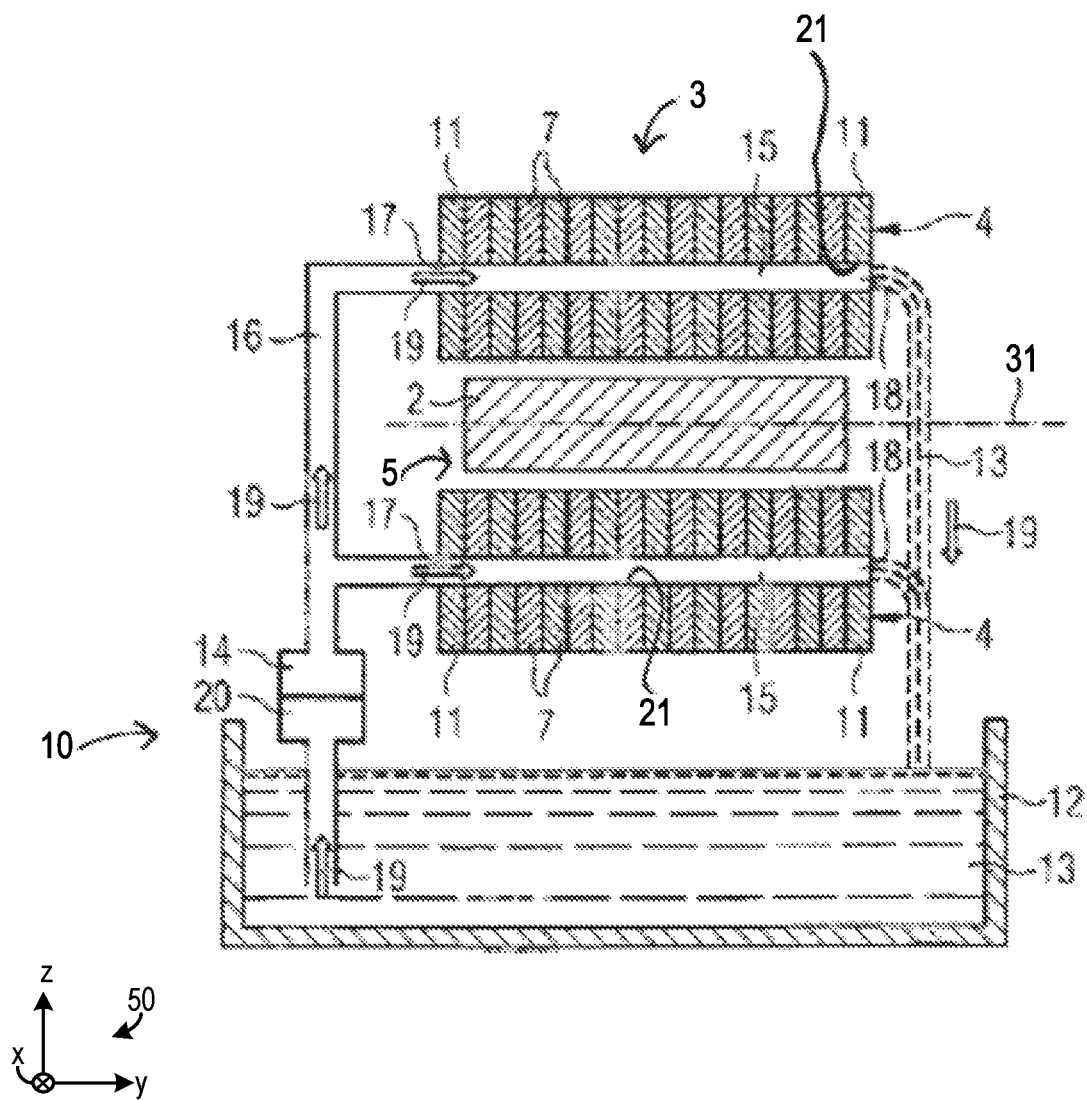
FIG. 1 schematically shows a longitudinal cross section of an electric machine according to the prior art.

Some electric motors have included a stator and a rotor rotatably mounted with respect to the stator. By energizing windings of the stator with an alternating current (AC) the rotor starts rotating. However, during operation of the electric motor, electric current energizing the windings results in heating of the windings due to the inherent resistance of the windings. Such heat can result in insulation degradation and thermal distortion of the machine. Moreover, such heat constrains the output power of the rotor.

Cooling an electric motor or generator can lead to a higher power density thereof. This facilitates downsizing of the machines, since a smaller machine can be used having the same power as its uncooled equivalent. Thus, in order to increase power density of electric motors and generators, it may be desirable to provide a cooling system to cool the respective machine.

Some prior motors provide cooling jackets that are press or shrink fitted around a stator component of the machine. However, providing additional cooling jackets increases the overall dimensions of the machine which impairs downsizing of the machine. Furthermore, efficiency of heat dissipation may not achieve desired levels due to thermal resistance between the stator and the cooling jacket as a result of contact resistance of the press or shrink fitted cooling jacket and the stator.

Other solutions integrate the cooling ducts into the stator itself rather than using a separate water jacket. For instance, documents EP 0 627 804 A2 and U.S. Pat. No. 8,519,577 B2 discuss cooling the stator by providing cooling channels in the stator.

The inventors have recognized an unmet need to further cool components of electric machines such as electric motors and generators.

The present disclosure has been made to address at least a portion of the issues stated above.

An electric machine cooling assembly is described herein that includes a stack of laminations for a stator. Each lamination includes a plurality of teeth, and a plurality of holes. The laminations are aligned relatively to one other such that the teeth form winding spaces for receiving stator windings, and the holes form at least one axially extending cooling channel inside the stack. Moreover, adjacent holes of at least two adjacent laminations are geometrically different.

By providing the above defined stack, the cooling channel is formed at least in part by geometrically different holes. This can result in a complex geometry of the cooling channel leading to a turbulent flow of the cooling fluid flowing in the cooling channel. This, in turn, may lead to increased heat transfer between the laminations and the cooling fluid. Geometrically different holes may mean that the holes of differ in size, shape, and/or orientation.

In one implementation form, a cross-section of the cooling channel varies along the axial direction. For instance, said cross-section may have at least two different shapes, sizes, and/or orientations along the axial extension of the cooling channel.

It can be envisaged that each lamination and/or a subset of laminations include a first set of holes and a second set of holes, wherein the holes of the first set differ geometrically from the holes of the second set. Thus, at least two different types of holes can be used in a lamination. Some of the laminations, however, may include solely one type of holes.

Optionally, at least two laminations and/or all laminations are equally shaped and sized, in particular with respect to their holes and teeth. However, the angular orientation of the at least two laminations relatively to one other may differ from each other. For instance, at least two adjacent laminations may be rotated relatively to one other such that the holes having different geometries of the adjacent laminations at least partially overlap to form the cooling channel. For example, each lamination includes n teeth, wherein a second lamination is rotated with respect to a first adjacent lamination by an angle of m*360°/n, wherein m is an integer greater than 0 and smaller than n. In a particular embodiment, each lamination includes n teeth, and each lamination is rotated with respect to its adjacent lamination by an angle of 360°/n. This can be particularly advantageous if identical laminations are used being manufactured by the same tool (see also below).

In a further development, at least one cooling channel includes at least one impingement element or impingement structure for laterally deflecting a cooling fluid in said cooling channel. The cooling fluid flow may impact against downstream facing surfaces of the impingement element and/or impingement structure. Laterally deflected means in this context that the flow direction of the cooling fluid has at least a local lateral component that is perpendicular to the axial component. By providing the impingement element or structure inside the cooling channel the cooling fluid flow may be made turbulent. Optionally, the impingement element or structure may be or include at least one fin or plate extending inside at least one of the holes. The impingement element or structure may divide the hole into a first subhole and a second subhole.

The teeth may project radially inwardly. Optionally, the holes are located at a side of the lamination opposing the teeth. For instance, the holes are located at a perimeter or circumference of the laminations (e.g., inner or outer perimeter), while the teeth are located at an opposing perimeter or circumference of the laminations (e.g., outer or inner perimeter). In typical embodiments, the laminations encompass a central aperture for receiving a rotor of the electric machine.

The number of cooling holes can be proportional to the number of teeth. Each tooth of a lamination may be assigned a plurality of holes. In one example, the number of cooling channels exceeds the number of teeth. Thus, each lamination may include a number of cooling holes that is greater than the number of teeth of said lamination.

Each lamination may include a magnetisable sheet or plate, e.g., made of steel, that is laminated with an electrically insulative coating for electrically insulating the laminations from each other. Optionally, the laminations, in particular the holes and the teeth thereof, are manufactured by the same, or similar, stamping tool or punching tool.

The cooling channels may be connectable to a cooling circuit for cooling the stator of the electric machine. Each cooling channel could include an inlet port for receiving a cooling fluid and/or and outlet port for discharging the cooling fluid from the stack. The cooling channels may be part of a cooling circuit. The cooling circuit may include a pump for pumping the cooling fluid through the cooling channels. Furthermore, a heat exchanger may be envisaged in the cooling circuit. In some embodiments, the cooling fluid includes a liquid such as oil. In some embodiments, the cooling fluid includes a gas such as air. The cooling fluid can be stable at working temperatures of the machine and/or can have electrically insulating properties.

The present disclosure also contemplates an electric machine comprising a stator having the above mentioned stack of laminations. The electric machine may be an electric motor and/or an electric generator. The electric machine may further include a rotor that is arranged radially to the stator. In some embodiments, the stator radially encompasses the rotor. Alternatively, the rotor may radially encompass the stator.

Furthermore, the present disclosure provides, according to various embodiments described, a method of manufacturing a stack of laminations. In some embodiments, the method includes the steps of providing a plurality of laminations, wherein each lamination has a plurality of teeth and a plurality of holes, and aligning the laminations relatively to one other such that the teeth form winding spaces for receiving stator windings, and the holes form axially extending cooling channels inside the stack.

In some embodiments, at least two adjacent holes of adjacent laminations are geometrically different.

Optionally, in the step of providing a plurality of laminations, substantially equally shaped laminations are provided, wherein each lamination includes at least two holes that are geometrically different. Geometrically different may mean that the corresponding holes have a different shape, size, and/or orientation. The method may further include the step of rotating adjacent laminations such that geometrically different holes of the adjacent laminations at least partially overlap to form the cooling channel.

Typically, the teeth and holes are provided in each lamination by a punching tool or a stamping tool. The laminations may be manufactured by the same, or similar, stamping or punching tool. This can the use of different stamping or punching tools during manufacturing to be avoided. By fabricating the laminations with the same tool, the cost of the laminations can be reduced while ease of assembly can be increased.

The method is particularly suited for manufacturing the above mentioned stack of laminations. The skilled person recognizes the features described only with regard to the method may be combined with the features described with regard to the stack and vice versa, as long as they do not contradict each other.

FIG. 1 schematically shows an electric machine 1 according to the prior art, for instance of the electric generator described in U.S. Pat. No. 8,519,577 B2. The electric machine 1 includes a stator 4 and a rotor 2. The stator 4 includes multiple laminations 7 embodied as laminations 7 (e.g., laminated plates) and stator windings that form inductor coils (not shown). The laminations 7 can be located inside a stator housing (not shown). The stator inductor coils are coiled up around teeth 6 formed by the laminations 7, see FIGS. 2, 3.

In case the electric machine 1 is a motor, the motor converts electrical energy fed to the stator windings to rotational energy of the rotor 2. The stator windings can be connected to an AC current source to receive alternating current. In alternative embodiments, the electric machine 1 may be a generator that converts mechanical energy of the rotating rotor 2 to electrical energy by means of electromagnetic induction. In this case, the stator windings are connected to an electrical grid for providing alternating current.

The stator 4 defines a central aperture 5. The rotor 2 is located inside the central aperture 5 and is able to rotate about a rotation axis 31. The stator 4 further includes two end plates 11. The laminations 7 are arranged between the two end plates 11. The end plates 11 are used to compress the laminations 7 to form the laminated stator core and at the same time provide support for the end loops of the stator coils.

FIG. 1 further illustrates a cooling circuit 10 for cooling the stator 4 of the electric machine 1. In one embodiment, the cooling circuit 10 includes a reservoir 12 filled with a cooling liquid 13, a pump 14 for pumping the cooling liquid, cooling channels 15 and/or a heat exchanger 20 for regulating a temperature of the cooling liquid.

Each stator lamination 7 and each end plate 11 includes a number of holes 21 which are located such that the holes 21 of the laminations 7 and the holes 21 of the end plates 11 are aligned with each other when the stator 4 is assembled to form a number of cooling channels 15. The cooling channels 15 can be formed by the stator material itself, i.e., they are not covered by a resin or the like.

Each cooling channel 15 may include an inlet port 17 which is located in one of the end plates 11 and an outlet port 18 which is located in the opposite end plate 11. The inlet port 17 can be connected to reservoir 12 via a tubing 16. The reservoir 12 can be filled with oil as cooling liquid 13. Between the reservoir 12 and the inlet port 17 pump 14 and heat exchanger 20 are located. The heat exchanger 20 can also be placed at another position. The cooling liquid 13 can be pumped via the pump 14 through the tubing 16 into the cooling channels 15. In FIG. 1, the direction of the fluid flow is indicated by arrows 19. The cooling liquid 13 which has passed the cooling channels 15 of the stator 4 returns to the reservoir 12 under the influence of gravity alone. Alternatively, the cooling liquid 13 which has passed the cooling channels 15 can be returned back to the reservoir 12 via additional tubing.

The inlet ports 17 may be fitted with nipples which facilitate piping. Rubber or plastic tubing 16 can be attached to the nipples. Moreover, the outlet ports 18 can be fitted with orifices that act as simple throttles for the liquid flow. The orifices at the duct outlet ports 18 enable even flow through all cooling ducts to be achieve by generally concentrating the pressure loss at the end of the cooling ducts 15. When the cooling fluid 13 emerges from the cooling channels 15 at the outlet port 18 it may either run through pipes back to the pump 14 or may simply be allowed to fall into the reservoir 12 at the bottom of the generator housing.

Generally, the cooling fluid can be oil as or a similar liquid that is stable at high temperatures, e.g., higher than 100°, or 200°, and may have good electrically insulating properties.

Thus, the cooling liquid (or sometimes gas) forced through the cooling channels 15 picks up heat energy from the laminations 7 and carries the heat to outside the machine 1 thus extending the power capability of the machine 1.

In accordance with the present disclosure, a stack 3 of laminations 7, 8, 9 or a stack of laminations 8, 9 is provided. Thus, laminations 8 and 9 are used in addition to the above described lamination 7 or instead of lamination 7. The stack 3 of laminations 7, 8, 9 can form the stator 4 of the machine 1 and/or can be used in combination with the machine 1 and/or the cooling circuit 10 as described above.

The stack 3 includes laminations 7, 8, 9, wherein parts of the laminations 8 and 9 are shown in FIGS. 2-5 in more detail. In the stack 3, the laminations 7, 8, 9 are in direct abutment with adjacent laminations. The laminations 7, 8, 9 may be pressed against one other such that the resulting cooling channels 25, 35 are fluid tight. This may allow the system to forgo additional seals, if wanted.

Each lamination 7, 8, 9 may include a metallic plate that is laminated with an electrically insulative coating for electrically insulating the laminations from each other. Generally, the laminations 7, 8, 9 may have a disk shape. The stack 3 may include at least 10, at least 100 or at least 1000 laminations or even more, depending on the practical application. Each lamination 7, 8, 9 may have a thickness of at least 0.1 millimeters (mm) and/or at most 1 mm. More specifically, said thickness may be at least 0.25 mm and/or at most 0.5 mm.

Figure 2:
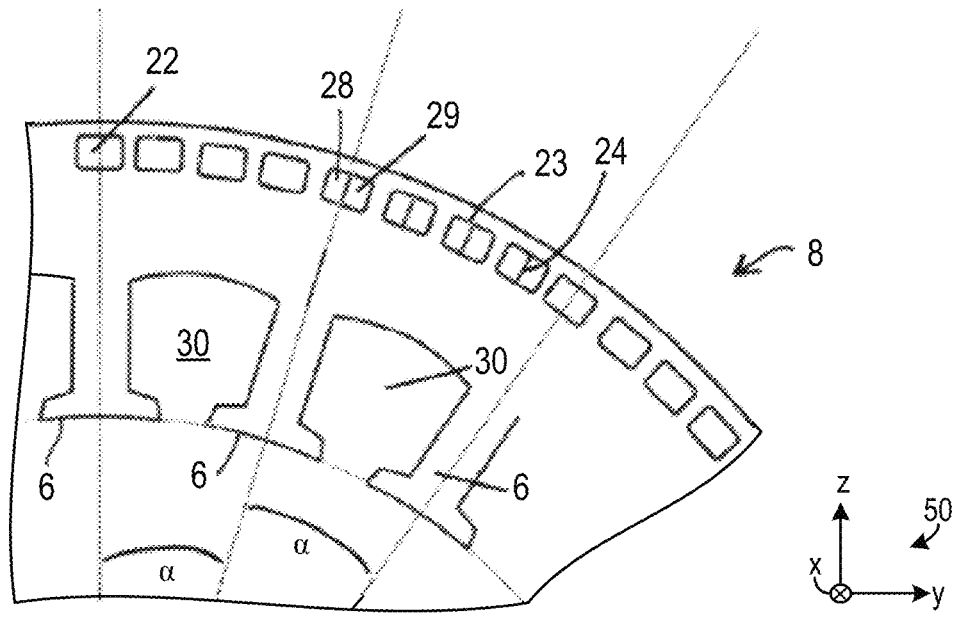
FIG. 2 schematically shows a part of a first lamination in a frontal view.
Figure 3:
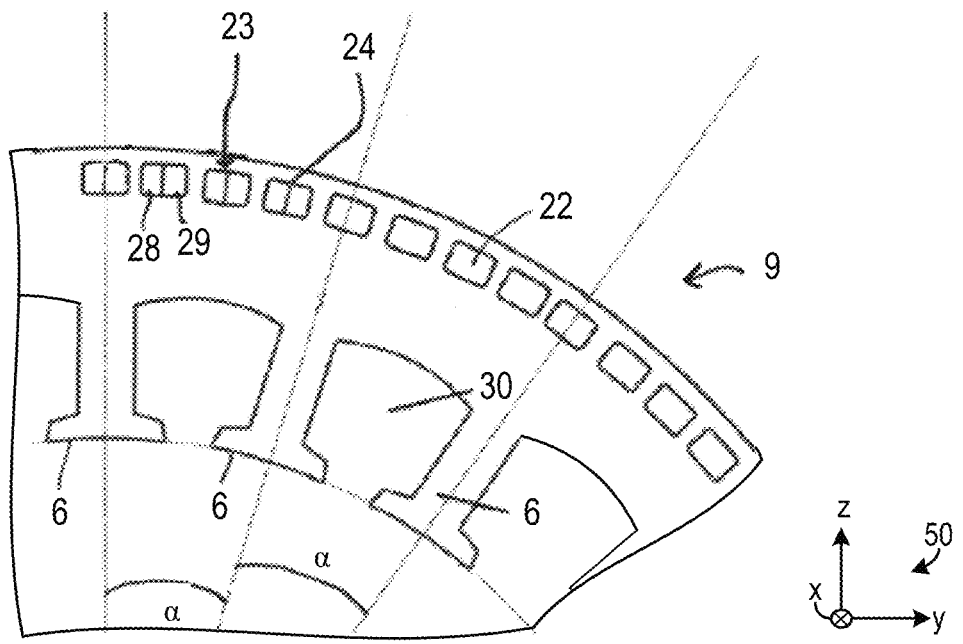
FIG. 3 schematically shows a part of a second lamination in a frontal view.

FIG. 2 shows a part of a first lamination 8 in a frontal view. FIG. 3 shows a part of a second lamination 9 in a frontal view. In the illustrated embodiments, each of the laminations 8, 9 has an inner periphery being defined by an array of inwardly projecting teeth 6. Usually, the teeth 6 are formed in the laminations 8, 9 by stamping out winding slots in the laminations. In the stack 3, the laminations 7, 8, 9 are aligned relatively to one other such that the teeth 6 provide the winding spaces for receiving stator windings of the stator 4. For instance, the number (n) of teeth 6 of each lamination 7, 8, 9 can be 24, 36, or 48. However, the number n of teeth is not restricted thereto. In alternative embodiments, the number n of teeth 6 may be smaller or greater than 24, 36, or 48.

The stack may include a first plurality of laminations 8 and a second plurality of laminations 9. The first and second laminations 8, 9 shown in FIGS. 2 and 3 are adjacent laminations in the stack 3. The first and second laminations 8, 9 may have the same structural design (i.e., shape and size). The only difference between the first and second laminations 8, 9 may be that the second lamination 9 is rotated with respect to the first lamination 8. More specifically, the second lamination 9 of the stack 3 is rotated over one tooth 3 with respect to the first lamination 8. Stated otherwise, each lamination 8, 9 include n teeth, wherein the second lamination 9 is rotated with respect to the first lamination 8 by angle $\alpha$ of 360°/n.

The first and second laminations include a first plurality of holes 22 and a second plurality of holes 23. The holes 22, 23 form at least one axially extending cooling channel 25, 35 inside the stack 3. As shown, the total number of holes 22, 23 is greater than the total number of teeth 6.

The holes 22, 23 are for instance located on a circle which shares its centre point with the rotor 2 of the electric machine 1. The number of holes 22, 23 on this circle is typically higher than the number of teeth 6/stator slots that carry the stator windings. The holes 22, 23 however, are not all identical. The holes 22 geometrically differ from the holes 23. For instance, the holes 22, 23 may have a different size, shape and/or orientation. Their geometry is chosen such that, when the stator 4 is stacked according to the process outlined below, cooling channels 25, 35 with complex 3D geometries can be created.

Each of the holes 23 includes an impingement member 24 (e.g., a baffle) that extends inside the hole 23 such that the hole 23 is divided into two subholes 28, 29. In some instances, the impingement member 24 may be a fin. As the laminations 8, 9 are rotated relatively to one other, the holes 23 having the impingement members 24 (e.g., fins) are aligned with the holes 22 without fins. Thus, differently shaped holes 22, 23 overlap resulting in axially extending cooling channels 25, 35 between holes on successive laminations.

Figure 4:
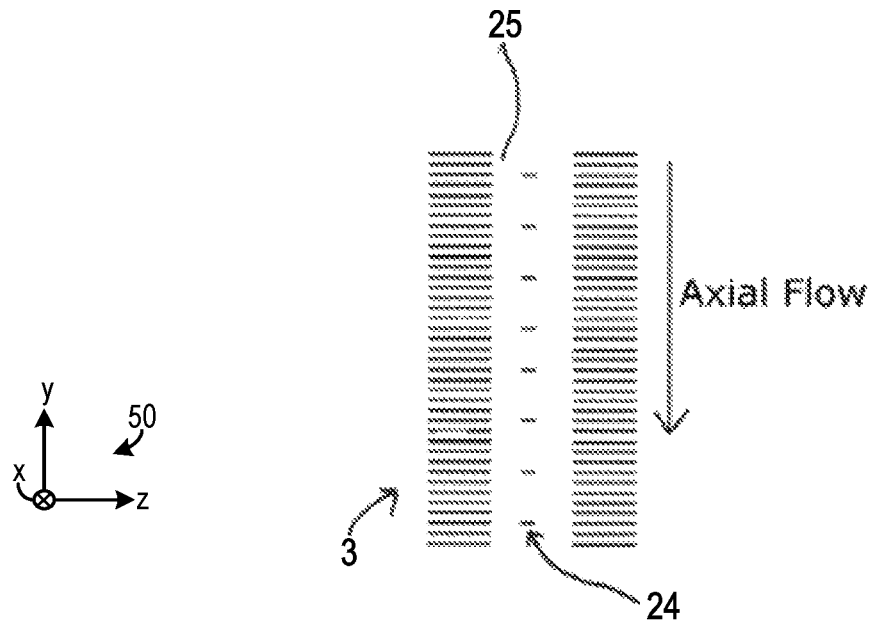
FIG. 4 schematically shows a top view of a section of a cooling channel.

FIG. 4 schematically shows a top view of a section of a cooling channel 25 formed by aligning the holes 22, 23 of the laminations 8, 9. As can be seen from FIG. 4, the impingement member 24 is located in the cooling channel 25 for laterally deflecting a cooling fluid in said cooling channel 25. The streams of cooling fluid are made turbulent by impacts against the downstream surfaces of each impingement member 24.

Figure 5:
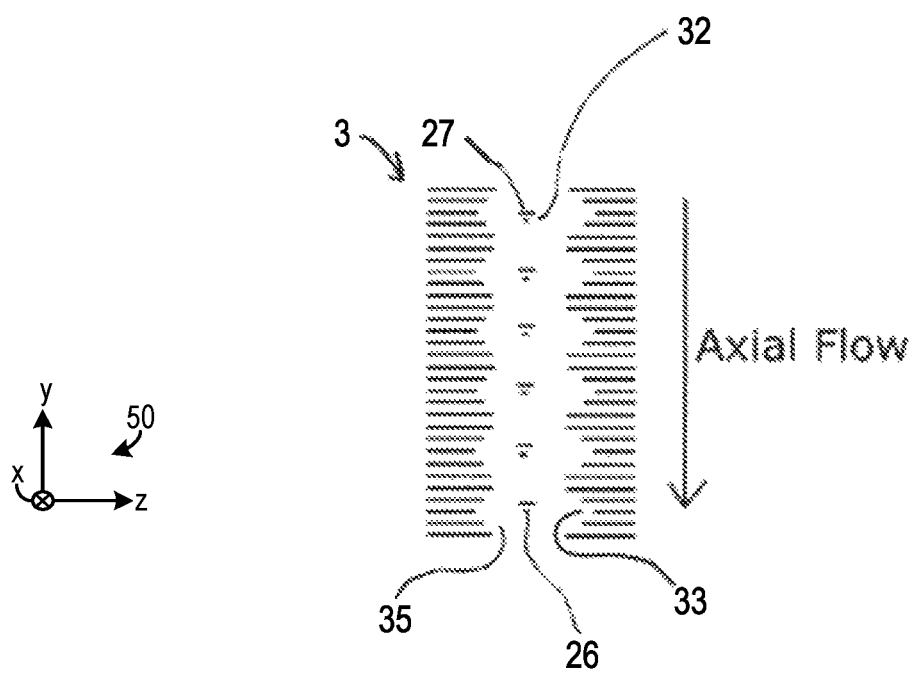
FIG. 5 schematically shows a top view of a section of a further cooling channel.

FIG. 5 schematically shows a top view of a section of a further cooling channel 35. The cooling channel 35 may be formed by aligning differently sized, shaped, and/or oriented holes of adjacent laminations 8, 9.

As can be seen from FIGS. 4 and 5, each cooling channel 25, 35 has a cross section that varies along the axial direction (i.e., rotation axis 31).

A difference between the cooling channel 35 of FIG. 5 and the cooling channel 25 is that the cooling channel 35 has a varying cross section even in sections of the cooling channel that do not include impingement members 24 (e.g., impingement plates). Furthermore, the cooling channel 35 shown in FIG. 5 includes two differently shaped impingement elements 26, 27 (e.g., impingement fins or plates), while the cooling channel 25 includes solely one kind of impingement member 24 (e.g., impingement fin).

By providing some of the punched holes 23 with a "bridge" also referred to as an impingement member 24, complex cooling channel geometries can be created. In some of the cooling channels, impingement member 24 is punched. When this lamination is used for stacking, the impingement members 24 will be present in all cooling channels 25, 35 since each lamination 9 is rotated by one tooth 6 with respect to the previous lamination 8. For instance, the second lamination 9 of FIG. 3 may be placed adjacent to the first lamination 8 of FIG. 2.

By changing the geometry (e.g., the size, shape, and/or orientation) of the adjacent holes 22, 23 in the laminations 8, 9, also more complex geometries can be created, with a more pronounced 3D shape of the impingement members 24, or a wall of the cooling channel 25, 35. An example is shown in FIG. 5, where it can be seen that an impingement structure 32 is formed by two adjacent impingement elements 26, 27 of adjacent laminations, the impingement structure 32 approximately having a triangular cross section. Moreover, in FIG. 5, a wall 33 of the channel 35 has an undulated shape. Many other geometries of the cooling channels 25, 35, the wall 33 and impingement elements or structures are possible, and can be the result of the cooling targets of particular electric machines.

The laminations 7, 8, 9 may also include apertures (not shown) for passage therethrough of fasteners, such as an elongated bolt which may be used in the assembly of the stator 4 and may assist in compressing the laminations against each other. Slots along the perimeter of the laminations 7, 8, 9 may be used to align the stacked laminations 7, 8, 9 of the stator 4.

Positioning the cooling channels 25, 35 adjacent the perimeter or circumference of the laminations 7, 8, 9 may prevent interfering with the electromagnetic flux in the lamination 7, 8, 9 generated by energizing the windings.

The present disclosure also relates to a method of manufacturing a stack 3 of laminations for a stator 4 of an electric machine 1. First, a plurality of laminations 8, 9 is provided by punching or stamping laminated metallic plates such that each lamination has a plurality of teeth 6 and a plurality of holes 22, 23. For instance, the teeth 6 and the holes 22, 23 are formed by using a punching tool. The teeth 6 may be formed by punching stator slots into the laminations. The holes 22, 23 are formed by punching apertures into the laminations. The laminations 8, 9 can have the same geometry (e.g., the same shape and size) and may be manufactured by the same, or similar, stamping tool or punching tool. Each lamination 8, 9 includes at least two holes 22, 23 that are geometrically different, i.e., have a different shape, size, and/or orientation.

In a subsequent step, the laminations 8, 9 are aligned relatively to one other such that the teeth 6 form winding spaces 30 for receiving stator windings, and the holes 22, 23 form axially extending cooling channels 25, 35 inside the stack 3. At least two adjacent holes (22, 23) of adjacent laminations 8, 9 are geometrically different.

During alignment of the laminations, adjacent laminations 8, 9 are rotated by an angle $\alpha$ relatively to one other such that geometrically different holes 22, 23 of the adjacent laminations 8, 9 at least partially overlap to form the cooling channel 25, 35. In particular, the angle $\alpha$ can be m*360°/n, where n is the number of teeth 6 of each lamination, and m is an integer smaller than n and greater than 0.

The method may be particularly suitable for manufacturing the stack 3 of laminations as described above with reference to FIGS. 2-5 and/or FIGS. 6A-8. Any features described with reference to the stack 3, the machine 1 and/or the cooling circuit 10 can be combined with the features of the method and vice versa as long as they do not contradict each other.

An axis system 50 is provided in FIG. 1, as well as FIGS. 2-9, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 6A:
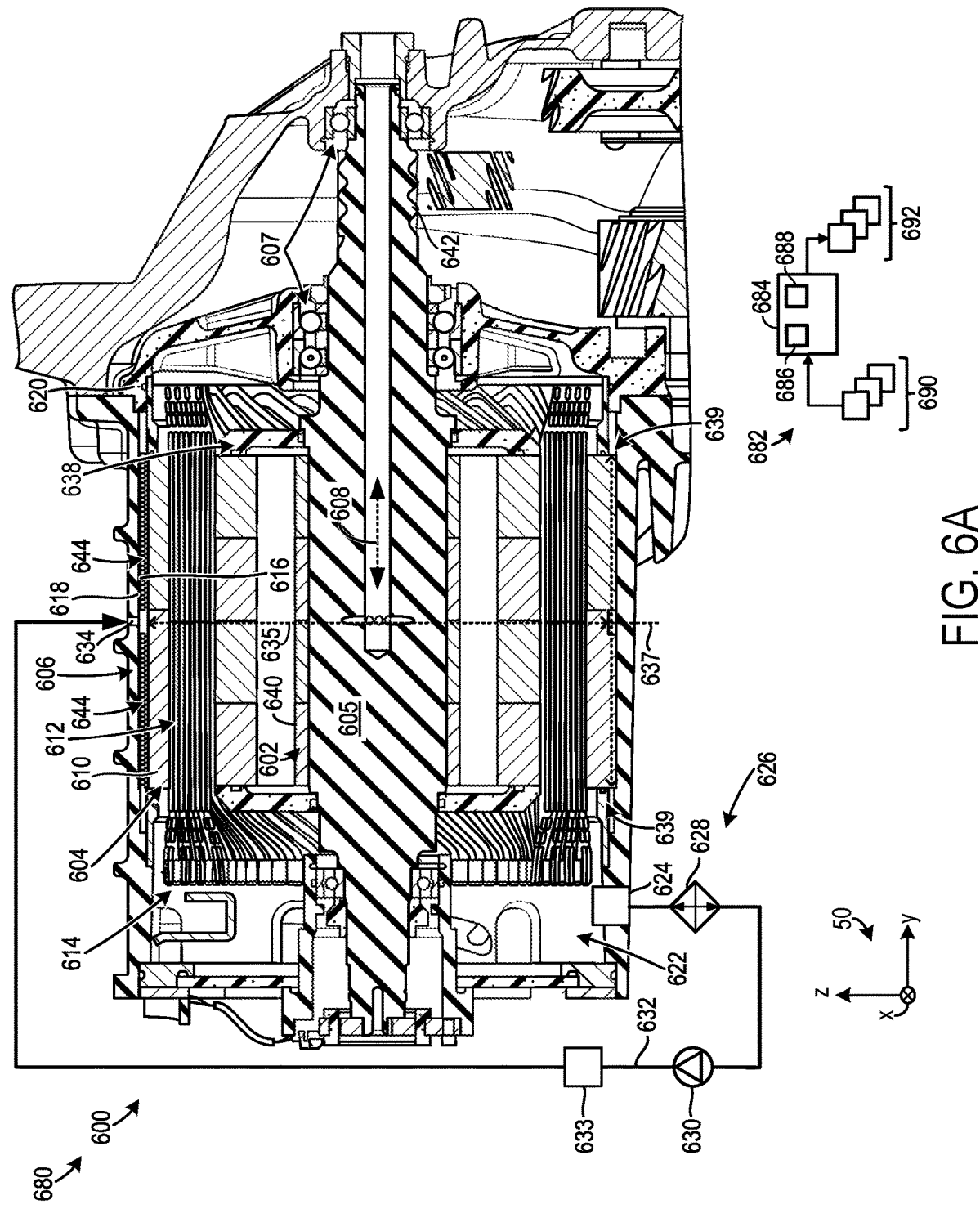
FIGS. 6A-6D show different views of an example electric machine with oil cooling channels in a stator.

FIG. 6A specifically shows an example of an electric machine 600 that includes a stator 602 and a rotor 604 which are enclosed in a housing 606. Specifically, in one example, the electric machine 600 may be an electric radial flux motor where flux is imposed in the radial direction of the motor. The rotor 604 is circumferentially surrounded by the stator 602 and coaxial thereto. The rotor 604 includes a rotor shaft 605 with bearings 607 coupled thereto and supporting and permitting rotation of the rotor shaft. A rotational axis 608 is provided in FIG. 6A. It will be appreciated that the central axis of the stator and the rotational axis 608 may be common axes.

The stator 602 may include multiple stator laminations, formed as a stack 610 of laminated plates, and stator coils 612 wound through the laminated stack to form end windings 614. For example, the end windings 614 illustrated in FIG. 6A, may be coiled around teeth. The stator laminations may be constructed out of steel (e.g., electrical steel, silicon steel, and the like). The housing 606 may be constructed out of a metal such as steel, aluminum, combinations thereof, and the like. In one particular example, the housing 606 may be constructed out of an aluminum alloy. Further, in one example, the housing 606 may include an interior surface 616 contacting an outer surface 618 of the stator lamination stack 602. The housing may further include covers 620 that permit a sealed enclosure 622 to be formed in the electric machine 600. Specifically, the covers 620 may be positioned at opposing axial ends of a body of the housing. Bolts, screws, welds, and/or other suitable attachment devices may be used to attach the covers to the body of the housing.

A sump, schematically depicted at 624, may be included in an oil cooling system 626 of the electric machine 600. The sump 624 may be positioned below the lamination stack 610 to collect oil from the oil channels which extend therethrough. The oil cooling system 626 may further include a filter 628, a pump 630, oil lines 632 which route the oil to an inlet 634 of oil channels 644, and/or a heat exchanger 633, discussed in greater detail herein. Thus, an oil circuit may be formed in the oil cooling system. Although the filter, pump, oil lines, and heat exchanger are depicted external to the housing 606, one or more of those components may be at least partially incorporated into the housing, in alternate embodiments. Further, the oil cooling system 626 includes the oil channels 644, and may include the oil inlet 634 as well as the other oil routing features described herein.

In one example, the electric machine 600 may further include one or more balancing plates 638. Specifically, as illustrated in FIG. 6, the balancing plates 638 are positioned on axial opposing sides of the rotor 604, although other arrangements are possible. The balancing plates 638 may be attached to the rotor shaft 605. Further, the balancing plate(s) may serve to fine tune the rotor's rotational mass balance and reduce the chance of imbalances that may decrease motor efficiency and/or lead to premature degradation of components thereof, in some cases.

The rotor 604 may include a rotor core 640. In embodiments where the electric motor 600 is a permanent magnet AC motor, the rotor core 640 may include permanent magnets that are embedded within rotor laminations of the rotor core. However, in other examples, the permanent magnets may be surface-mounted on the rotor laminations.

The rotor shaft 605 permits rotational energy to be transferred from the motor to an external device (e.g., transmission, differential, and the like) or vice versa. A gear 642 may reside on the rotor shaft 605 and mesh with a gear in a gearbox to transfer power thereto. The bearings 607 support and permit rotation of the rotor shaft 605.

In order to effect direct stator cooling, the stator 602 may include multiple oil channels 644. The oil channels extend through at least a portion of the stator lamination stack 610. By incorporating the oil channels for stator cooling directly into the stator, the electric machine's space efficiency can be increased when compared to electric machines with water jackets. In particular, the machine's overall diameter may be decreased, if wanted. Further, the thermal resistance between the stator and the cooling fluid may be reduced, when compared to stator cooling arrangements which use water jackets. Even further, by flowing oil directly through the stator, contact resistance can be avoided, if wanted.

The oil channels 644 may be formed in the stator laminations, by aligning (or partially aligning) holes formed in adjacent laminations in the stator laminations, so that when the stator laminations are pressed together to form the stack 610, the holes will form the oil channels 644 which generally axially traverse the lamination stack. Thus, oil generally flows through the oil channels in the axial direction. As will be discussed in greater detail herein, the stator laminations with the holes that form the oil channels may be rotated with respect to one another such that a complex flow pattern is formed that achieves a targeted amount of turbulence and stator cooling, consequently. This complex flow pattern may increase the heat transfer coefficient between the channel surface and the oil by a factor of approximately three, in some cases. Consequently, electric machine operating efficiency is increased, and the likelihood of component degradation caused by elevated stator temperatures may be reduced.

The oil channel inlet 634 may extend through the housing 606, and deliver oil to the oil channels 644. Thus, the oil channel inlet 634 functions as a manifold for the oil channels and may at least partially circumferentially extend around the lamination stack 610. The oil channel inlet 634 is shown positioned near an axial mid-point 637 between axial opposing ends 639 of the stack 610. This oil inlet arrangement may provide more balanced cooling of the stator when compared to designs with the inlet positioned at or near an axial end of the stator stack, which however may be used, in other embodiments. The laminations that form the oil channel inlet 634 may have a smaller outer diameter 635 than the portion of the stator laminations that form the oil channels. Further, in such an example, the smaller diameter laminations that form the inlet do not have holes. Profiling the laminations in this manner permits oil to be efficiently directed into the oil channels.

Heat may be transferred from laminations to the oil channels 644. This heated oil may then flow to the sump 624. From the sump 624 the oil may be directed to the heat exchanger 633. In other examples, heat may be transferred from the oil to a water jacket or heat from the oil may be transferred to the surrounding environment through the oil lines 632. Thus, heat may be generally transferred from the laminations to the oil circuit. Each of the stator laminations in the stack 610 may include three or more types of holes arranged around an outer diameter.

Specifically, each lamination may include a plurality of holes positioned around their circumference. The holes in sequential laminations may be aligned so as to provide multiple oil channels that axially traverse the stator 602. To elaborate, the holes may be cutouts in the laminations. The geometry of the stator holes and the alignment of sequential holes to form the oil channels is discussed in greater detail herein with regard to FIGS. 7-9.

The electric machine 600 may generally be included in an electric drive assembly 680 that may include a control system 682 with a controller 684. However, the electric machine may be used in other fields such as manufacturing, in other examples. The controller may include a processor 686 and a memory 688 with instructions stored therein that, when executed by the processor, cause the controller to perform various methods, control techniques, etc. described herein. The processor may include a microprocessor unit and/or other types of circuits. The memory may include known data storage mediums, such as random access memory, read only memory, keep alive memory, combinations thereof, and the like.

The controller 684 may receive various signals from sensors 690 positioned in the electric drive assembly 680 and specifically the electric machine 600. Conversely, the controller 684 may send control signals to various actuators 692 at different locations in the system based on the sensor signals. For instance, the controller 684 may send command signals to the oil pump 630 and, in response, an actuator in the pump may be adjusted to alter the flowrate of the oil delivered therefrom. In other examples, the controller may send control signals to the electric machine 600 and, responsive to receiving the command signals, the electric machine may be adjusted to alter rotor speed. The other controllable components in the system, may be operated in a similar manner with regard to sensor signals and actuator adjustment.

The controller 684 may be designed to implement the following method. The method includes operating the oil pump 630 to generate a turbulent flow of oil through the oil channels 644 in the stack 610. Operating the oil pump in this manner may include flowing the oil from an outlet of the oil pump to the oil channel inlet 634. The method may further include flowing oil from the sump 624 to the oil channel inlet 634. In this way, oil may be efficiently routed through the cooling system to effectively remove heat from the stator.

Figure 6B:
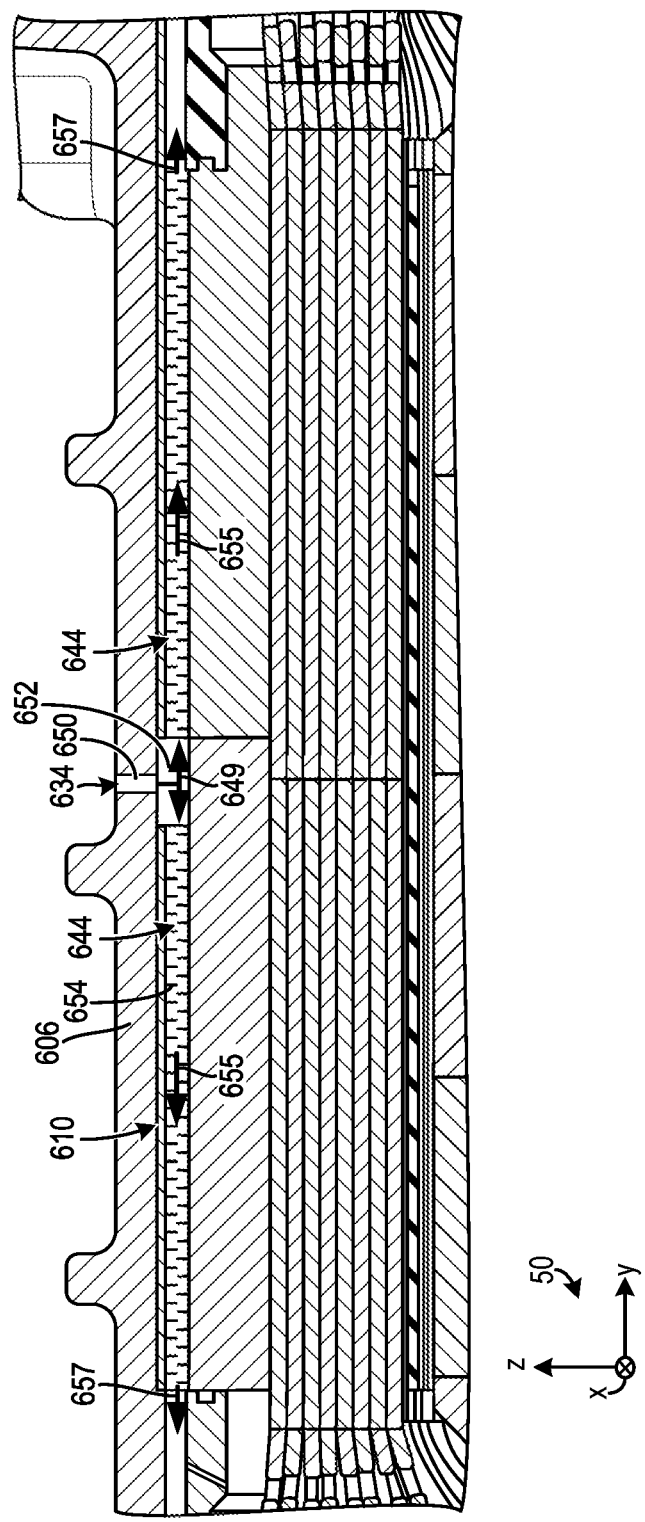

FIG. 6B shows a detailed view of the oil channels 644 and the oil channel inlet 634. Arrows 649 indicate the general direction of oil flow from the inlet 634 into the oil channels 644. The inlet 634 may include a first section 650 that extends (e.g., radially extends) through the housing 606 and a second section 652 that is formed by a set of laminations that have a smaller diameter than the portion of the laminations used to form the oil channels 644. Thus, the set of laminations that form the second section 652 of the oil channel inlet 634 may not have cutouts. As shown, the oil channels 644 generally axially extend through the stator lamination stack 610. Arrows 655 indicate the general direction of oil flow through the channels and arrows 657 indicate the general direction of oil flow exiting the channels, although the flow pattern has greater complexity further elaborated upon herein. Further, as shown, flow obstructions 654 (e.g., bends, baffles, and the like) are formed in the oil channels 644 to increase turbulence and therefore the amount of heat transferred from the laminations to the oil. The construction of the complex flow pattern achieved in the oil flow channels is expanded upon herein with regard to FIGS. 7-9.

Figure 6C:
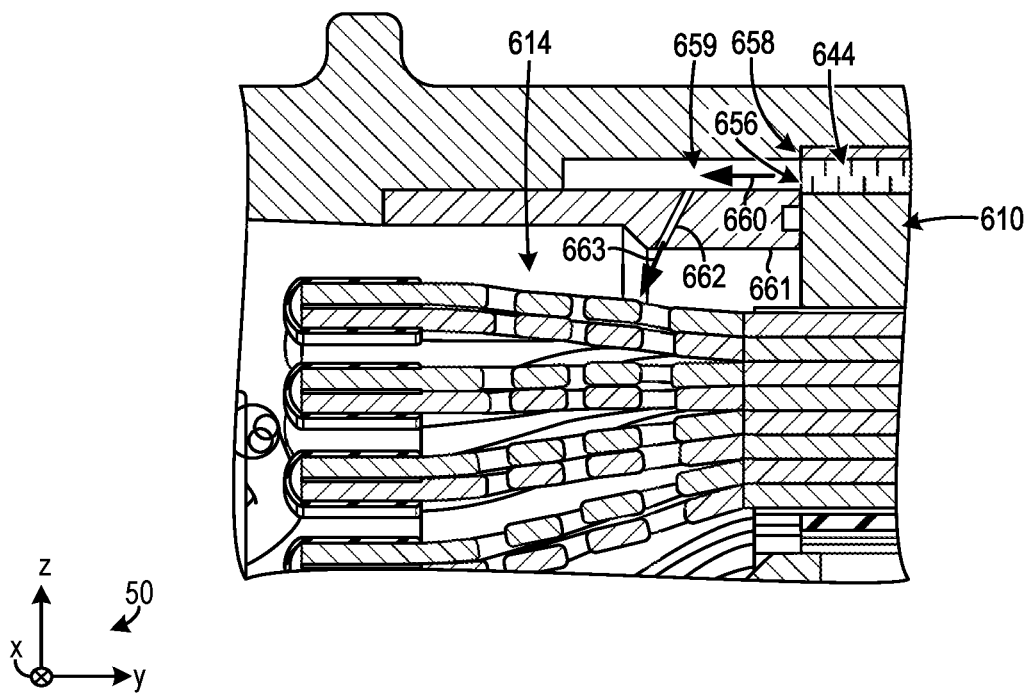

FIG. 6C shows a detailed view of an outlet 656 of one of the oil channels 644. The outlet 656 is positioned at an axial end 658 of the stator lamination stack 610. Arrow 660 indicates the general direction of oil flow exiting the outlet 656. From the outlet 656 oil flows into a cavity 659 surrounding a spray ring 661. An opening 662 may extend through the spray ring 661. Arrow 663 indicates the general flow of oil exiting the opening 662. Said opening 662 therefore flows oil towards the end windings 614, thereby cooling the end windings and increasing motor operating efficiency. However, in other examples, the opening 662 may be omitted from the spray ring 661.

Figure 6D:
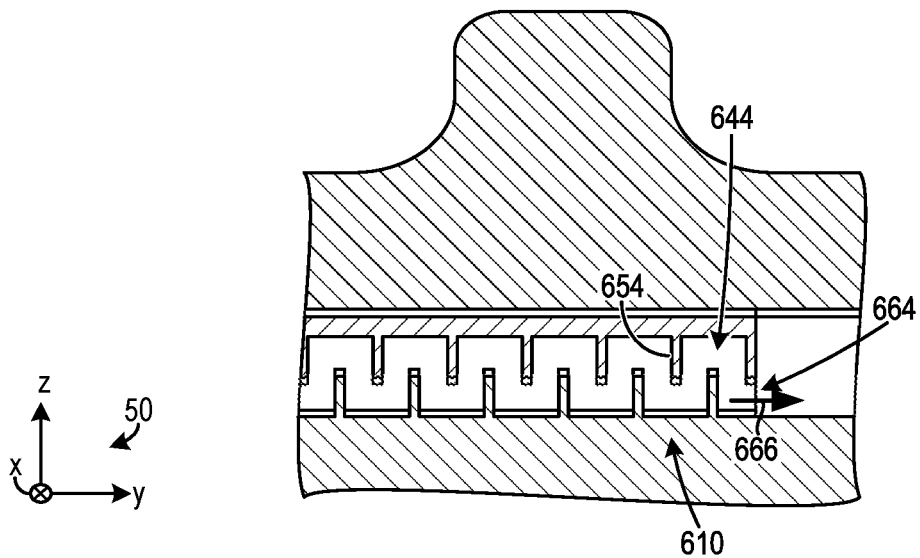

FIG. 6D shows a more detailed view of another outlet 664 in one of the oil channels 644. Arrow 666 signifies the general direction of oil flow exiting the outlet 664. Again, the flow obstructions 654 formed by the arrangement of sequential laminations in the stator lamination stack 610 are shown.

Figure 7:
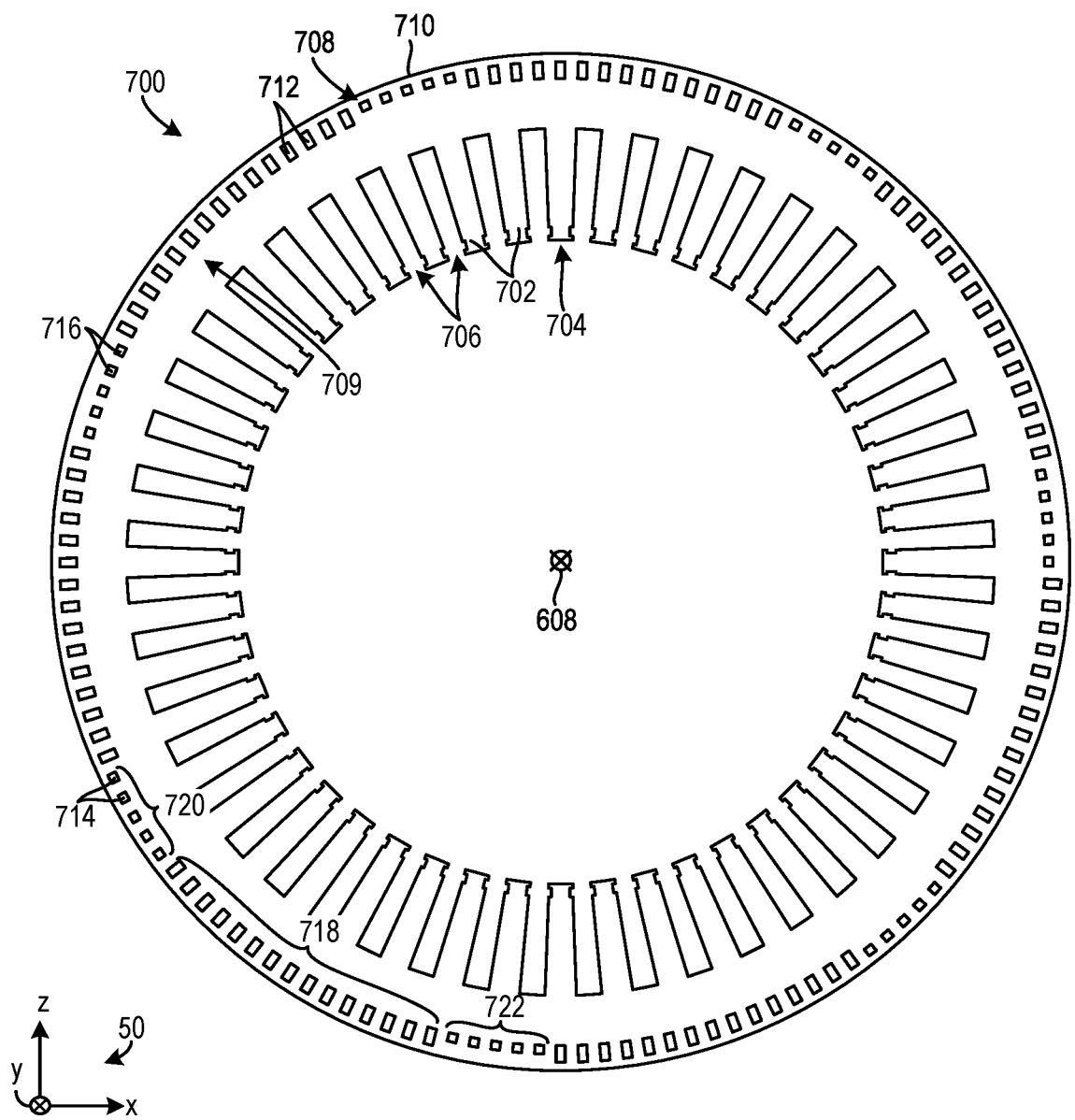
FIG. 7 shows an example of a stator lamination with holes.

FIG. 7 shows an exemplary stator lamination 700 that may be included in the stator lamination stack 610 illustrated in FIGS. 6A-6D. Specifically, in one example, each of the laminations in the stack 610 may have a similar geometry, and the flow obstructions may be formed by arranging the laminations at different positions with regard to the central axis 608 (aligned with the rotational axis of the motor's rotor). In this way, the stator's manufacturing efficiency may be increased and production costs may be reduced, if wanted. The angular position of sequential laminations is discussed in greater detail herein with regard to FIGS. 8A-9. Further, the lamination 700 includes teeth 702 positioned along inner periphery 704 and slots 706 positioned between the teeth. As such, the teeth 702 are positioned radially inward from holes 708. When the stator is constructed, windings may extend through the teeth. Further, the number of holes in the lamination may be greater than the number of teeth, to increase stator cooling. However, other lamination constructions have been contemplated.

The lamination 700 includes a yoke 709. The yoke 709 may be made radially thicker than laminations without oil holes so that the magnetic flux paths are not restricted. However, the overall diameter of the stack of stator laminations is smaller than a motor designed with a water jacket surrounding the housing and cooling the lamination stack.

The holes 708 that circumferentially extend around the outer diameter 710 of the lamination. The holes 708 may be formed by punching, stamping, drilling, or the like. For instance, a single punch die may be used to manufacture the different hole types discussed herein. In this way, the complex pin fin arrangement may be achieved using a low cost stator manufacturing technique. The holes have different shapes and may be conceptually divided into multiple types of holes that may be arranged in sets. Specifically, the holes 708 may be classified as types A-C. Type A holes are indicated at 712, type B holes are indicated at 714, and type C holes are indicated at 716. The type A holes have a greater area than the type B and C holes. As discussed herein, the area of the holes may be the area of the hole measured in a plane perpendicular to the stator's central axis. Further, the type B and the type C holes may have a similar area. However, the type C holes may be positioned radially inward with regard to type B holes. By designing the holes with a different radial positon and area, the oil flow pattern through the oil passage may be made more circuitous, thereby increasing turbulence in the oil to increase stator cooling.

Holes of each types may be positioned sequentially together to form a set (i.e., group) of multiple holes. For instance, FIG. 7 illustrates fifteen type A holes that form a set 718, five type B holes that form a set 720, and five type C holes that form a set 722. Further, as illustrated in FIG. 7, when moving circumferentially around the lamination, the sets may be arranged as follows: type A set, type B set, type A set, type C set, type B set, and so on. The holes may be conceptually associated with the slots 706 between the teeth. Thus, the grouping of the holes that are associated with each slot may have identical numbers of holes. Specifically, in the illustrated example, each slot has five associated holes, although this number may vary in different embodiments. The arc width of each slot may approximately correspond to the gaps between the teeth 702. To assign a hole type to the slots, the following pattern may be repeated: type A, type A, type A, type B, type A, type A, type A, type C, and so on. As such, the pattern may have a periodicity of eight. However, in general, the periodicity can be changed to: a×type A, b×type B, a×type A, c×type C. In such an example, the number of stator slots may be a multiple of a+b+a+c. Specifically, Nbholes of one specific type may be assigned to each stator slot and may therefore be another integer.

FIGS. 8A-8C show an exemplary type A hole 712 near the outer diameter 710 of the lamination 700, FIG. 8B shows an exemplary type B hole 714 in the lamination 700, and FIG. 8C shows. The holes 712, 714, 716 are polygonal in shape (e.g., rectangular, square, hexagonal, and the like). Thus, the holes are formed by an outer side 800, an inner side 802, and lateral sides 804 which are straight, in the illustrated example. In alternate example, at least one of the sides and/or the corners of the polygonal holes may be curved to tune the flow pattern in the channels and achieve a targeted amount of turbulence. Providing curved corners and/or sides in the cutouts permits the oil turbulence to be more granularly tuned to meet stator cooling targets. Further, the holes 712, 714, 716 are formed near the outer diameter 710 of the lamination, as previously discussed.

The holes 712 have a greater area than holes 714 and 716 and the holes 716 are positioned radially inward in relation to the holes 714. In this way, a desired amount of turbulence may be generated in the laminations which increases the contact area between the stator and the oil. As a result, stator cooling may be increased which may result in increased electric machine operating efficiency.

In one use case example, the type A hole 712 (shown in FIG. 8A) may have a rectangular dimension of 3 mm×1.5 mm, the type B hole 714 (shown in FIG. 8B) and the type C hole 716 (shown in FIG. 8C) may have a rectangular dimension of 1.5 mm×1.5 mm. However, numerous sizes and geometries of the holes have been contemplated and may be selected based on the size of the motor, the operating speed range of the motor, expected motor load, motor cooling targets, etc. In particular, the aspect ratio of the rectangular holes may be selected to increase stator cooling.

FIGS. 8D-8F show alternate or additional types of holes that may be included in a stator lamination 850. The holes in the lamination 850, shown in FIGS. 8D-8F may be additionally or alternatively be formed in the stator lamination 700, shown in FIG. 7. As such, in certain embodiments each of the laminations in the stator stack may have four or more types of holes that have a different radial or lateral position and/or area. Thus, one specific example each of the laminations in the stator stack may be substantially identical and the complex flow pattern in the stator may be achieved by rotating sequential laminations to align holes of different types to create flow obstructions, bends in the oil channel, etc.

FIG. 8D specifically shows a hole 852 with a baffle 854 (e.g., mid-flow obstruction). The hole 852 is positioned near an outer diameter 853 of the lamination 850. The baffle 854 may be positioned near a centerline of the hole 852. However, in alternate examples, the baffle 854 may be offset from the centerline of the hole. The baffle 854 divides the holes into a first section 856 and a second section 858.

FIGS. 8E and 8F show holes 860 and 862, respectively, that have a smaller area than the hole 852, shown in FIG. 8A. Specifically, the holes 860, 862 may each have half the area of the hole 852, shown in FIG. 8A. However, the holes 860, 862 shown in FIGS. 8E and 8F, respectively, are laterally offset along the x-axis.

In one specific embodiment, each of the stator laminations may include holes of types A-D. In such an embodiment, the following pattern may be repeated: a×type A, d×type D, a×type A, b×type B, a×type A, d×type D, a×type A, c×type C. Further, Nbholes of one specific type may be assigned to each stator slot. In one specific use case example the pattern may have the following values: a=1, b=1, c=1, d=1, Nbholes=5.

In another embodiment, each of the stator laminations may include holes of type A and type D. In such an embodiment, to assign a hole type to the slots, the following pattern may be repeated: a×type A, d×type D, a×type A. In this embodiment, the number of stator slots can be a multiple of 2a+d. Again, Nbholes of one specific type may be assigned to each stator slot. In one specific use case example the pattern may have the following values: a=3, d=1, Nbholes=5.

In another embodiment, each of the stator laminations may include holes of types A, E, and F. Hole types E and F may have a similar height to the type A hole but may have a smaller width (e.g., half the width). In such an embodiment, the following pattern may be repeated: a×type A, e×type E, a×type A, f×type F. Nbholes of one specific type may be assigned to each stator slot. In one specific use case example the pattern may have the following values: a=3, e=1, f=1, Nbholes=5.

FIG. 9 shows another exemplary stator lamination stack 900 including a plurality of laminations 902 with holes 904 that form an oil channel 906. The lamination stack 900 is an example of the lamination stack 610, shown in FIGS. 6A-6D. As such, the lamination stack 900 may be included in an electric machine such as the electric machine 600, shown in FIGS. 6A-6D. Continuing with FIG. 9, as previously discussed, oil generally flows through the oil channel 906 in an axial direction but achieves a turbulent flow pattern through a complex 3-dimensional geometry through the use of holes of different types and rotating sequential laminations with regard to one another when constructing the stack. Specifically, when constructing the stator stack, each lamination may be rotated by one tooth. Thus, the degree of rotation of each lamination may be three hundred and sixty divided by the number of teeth in the lamination (T) (360/T). In this way, the wall of the resulting oil channel (functioning as a cooling duct) can be shaped at will, and pin fins with a selectable geometry may be made. By routing the oil directly through the stack, contact resistance may be substantially eliminated and the contact area between the stator and cooling fluid is increased, when compared to stators using water jackets that surround, or are integrated into, the motor housing. In other words, sequential laminations may be rotated such that a hole of one type is aligned and overlaps with a hole of another type. For instance, as illustrated in FIG. 9 (viewed from left to right), a type C hole is aligned and overlaps with a type A hole, then three type A holes are aligned with one another, and next the type A hole is aligned and overlaps with a type B hole, etc. In this way, a complex flow path is achieved that increases turbulence and stator cooling.

The laminations 902 may be classified in three lamination types (type A, type B, and type C). Type A laminations are indicated at 908, type B laminations are indicated at 910, and type C laminations are indicated at 912. In the illustrated example, the stack of laminations is formed with the following pattern: three type A laminations, one type B lamination, three type A laminations, one type C laminations, and so on. However, as previously discussed, the stack may include four or more types of laminations.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Even further, elements shown offset from one another may be referred to as such.

The invention will be further described in the following paragraphs. In one aspect, an electric machine system is provided that comprises a stack of a plurality of stator laminations with at least a portion of the plurality of stator laminations each including a plurality of holes that are arranged radially outward from a plurality of teeth, wherein the plurality of holes includes: a first set of holes, a second set of holes, and a third set of holes; wherein the first, second, and third sets of holes has a different profile and/or area; wherein the second set of holes are positioned radially inward from the third set of holes; and wherein a plurality of oil channels are formed by an alignment of holes in adjacent stator laminations in the portion of the plurality of stator laminations.

In another aspect, a method for operation of an electric machine cooling system is provided that comprises operating an oil pump to generate a turbulent flow of oil through a plurality of oil channels in a stack of a plurality of stator laminations that are located radially outward from a plurality of teeth in the plurality of stator laminations; wherein each of the plurality of oil channels are formed by sequentially arranged holes in the stack of the plurality of stator laminations; wherein three or more of the sequentially arranged holes a different shape and/or area; and wherein two or more of the sequentially arranged holes are radially offset from one another. The method may further comprise, in one example, flowing oil from a sump positioned below the stack of the plurality of stator laminations to an inlet of the oil pump.

In yet another aspect, an electric machine cooling system is provided that comprises a stack of a plurality of stator laminations with a first portion of the plurality of stator laminations each including a plurality of holes that are arranged radially outward from a plurality of teeth, wherein the plurality of holes includes: a first set of holes and a second set of holes having different areas; and a third set of holes having a different radial position in relation to the second set of holes; and wherein a plurality of oil channels are formed by an alignment of holes in adjacent stator laminations in the first portion of the plurality of stator laminations; and wherein a second portion of the plurality of stator laminations have a smaller outer diameter than the first portion of the plurality of stator laminations and form an inlet to the plurality of oil channels.

In any of the aspects or combinations of the aspects, the portion of the plurality of stator laminations that includes the plurality of holes may be identical in shape and size and wherein sequential stator laminations in the portion of the plurality of stator laminations are rotated with respect to one another.

In any of the aspects or combinations of the aspects, the sequential laminations may be rotated such that the first set of holes in a first stator lamination overlaps with the second or third set of holes in a second stator lamination.

In any of the aspects or combinations of the aspects, the second and third sets of holes may have an identical area.

In any of the aspects or combinations of the aspects, the plurality of holes may include a fourth set of holes with a baffle.

In any of the aspects or combinations of the aspects, the first set of holes may have a greater number of holes than the holes in the second set of holes and/or the third set of holes.

In any of the aspects or combinations of the aspects, each of the plurality of holes may include at least one side which is planar.

In any of the aspects or combinations of the aspects, each of the plurality of holes may include at least one corner which is curved.

In any of the aspects or combinations of the aspects, a portion of the plurality of stator laminations may have a smaller outer diameter than a remainder of the plurality of stator laminations and oil may be directed into the plurality of oil channels via the plurality of stator laminations that have the smaller outer diameter.

In any of the aspects or combinations of the aspects, operating the oil pump to flow the oil through the plurality of oil channels may include flowing the oil from an outlet of the oil pump to an oil inlet that extends through a housing and opens into a set of the plurality of stator laminations that may have a smaller diameter than a remainder of the plurality of stator laminations.

In any of the aspects or combinations of the aspects, the oil inlet may be positioned adjacent to a mid-point between opposing axial ends of the stack of the plurality of stator laminations.

In any of the aspects or combinations of the aspects, the inlet may be positioned between axially opposing ends of the stack of the plurality of stator laminations.

In any of the aspects or combinations of the aspects, the types of holes in the adjacent stator laminations that form the plurality of oil channels may have a periodicity.

In any of the aspects or combinations of the aspects, the plurality of holes each may include at least one side that is straight and/or at least one side that is curved.

In any of the aspects or combinations of the aspects, each of the holes in the second and third sets of holes may have an identical area.

In any of the aspects or combinations of the aspects, each of the holes in the first set of holes may have a greater area than each of the holes in the second and third sets of holes.

In any of the aspects or combinations of the aspects, the plurality of oil channels may be positioned radially outward from stator windings.

In another representation, a stator lamination stack is provided that includes a plurality of geometrically identical laminations with a plurality of cutouts circumferentially surrounding the outer diameters of the lamination, where the plurality of cutouts have at least three different shapes and/or sizes, where sequential laminations are rotated in relation to one another to form cooling ducts with an overlapping arrangement of the differently shaped and/or sized cutouts, and where a yoke of each lamination is sized to prevent restriction of magnetic flux paths.

Throughout this specification relative language such as the words "approximately" may be used. Unless otherwise specified or described, this language seeks to incorporate within 5% variability to the specified number or range. That variability may be plus 5% or negative 5% of the particular number specified.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

It will be appreciated that the configurations and routines disclosed herein are exemplary in nature, and that these specific embodiments are not to be considered in a limiting sense, because numerous variations are possible. For example, the above technology can be applied to powertrains that include different types of propulsion sources including different types of electric machines. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

The invention claimed is:

1. An electric machine system, comprising:
   a stack of a plurality of stator laminations with at least a portion of the plurality of stator laminations each including a plurality of holes that are arranged radially outward from a plurality of teeth, wherein the plurality of holes include:
   a first set of holes, a second set of holes, and a third set of holes which each have rectangular shapes and are positioned radially outward from a plurality of teeth in the stator lamination;
   wherein each of the holes in the second set of holes and the third set of holes have an equivalent cross-sectional area;
   wherein each of the holes in the first set of holes has a greater cross-sectional area than the holes in the second set of holes and the third set of holes;
   wherein the first set of holes has a greater number of holes than a combined number of holes in the second set of holes and the third set of holes;
   wherein the first set of holes, the second set of holes, and the third set of holes have different radial positions with regard to one another;
   wherein the second set of holes is positioned radially inward in relation to the third set of holes;
   wherein a plurality of oil channels are formed by an alignment of holes in adjacent stator laminations in the portion of the plurality of stator laminations that includes the plurality of holes;
   an oil inlet in fluidic communication with the plurality of oil channels and extending through a housing;
   a cavity surrounding a spray ring and in fluidic communication with outlets of the plurality of oil channels; and
   an opening extending through the spray ring and directing oil towards stator end windings;
   wherein oil in the plurality of oil channels flows axially outwards in opposing directions;
   wherein the oil inlet is positioned at or near a mid-point between opposing ends of the stack of the plurality of stator laminations;
   wherein a portion of the plurality of stator laminations has a smaller outer diameter than another portion of the plurality of stator laminations; and
   wherein the portion of the plurality of stator laminations with the smaller diameter forms a section of the oil inlet.

2. The electric machine system of claim 1, wherein the portion of the plurality of stator laminations that includes the plurality of holes is identical in shape and size, and wherein sequential stator laminations in the portion of the plurality of stator laminations are rotated with respect to one another.

3. The electric machine system of claim 2, wherein the sequential stator laminations are rotated such that the first set of holes in a first stator lamination overlaps with the second or third set of holes in a second stator lamination.

4. The electric machine system of claim 1, wherein the second and third sets of holes have an identical area.

5. The electric machine system of claim 1, wherein the plurality of holes include a fourth set of holes with baffles that are positioned near centerlines of the plurality of holes and are radially aligned.

6. The electric machine system of claim 1, wherein the first set of holes, the second set of holes, and the third set of holes have equivalent widths.

7. The electric machine system of claim 1, wherein each of the plurality of holes includes at least one side which is planar.

8. The electric machine system of claim 1, wherein each of the plurality of holes includes at least one side that is straight.

9. The electric machine system of claim 1, wherein a portion of the plurality of stator laminations has a smaller outer diameter than a remainder of the plurality of stator laminations, and wherein oil is directed into the plurality of oil channels via the portion of the plurality of stator laminations that has the smaller outer diameter.

10. A method for operation of an electric machine cooling system, comprising:
operating an oil pump to generate a turbulent flow of oil through a plurality of oil channels in a stack of a plurality of stator laminations that are located radially outward from a plurality of teeth in the plurality of stator laminations;
flowing oil into an oil inlet in fluidic communication with the plurality of oil channels and extending through a housing;
flowing oil into a cavity surrounding a spray ring and in fluidic communication with outlets of the plurality of oil channels; and
flowing oil into an opening extending through the spray ring and directing oil towards stator end windings;
wherein oil in the plurality of oil channels flows axially outwards in opposing directions;
wherein each of the plurality of oil channels is formed by sequentially arranged holes in the stack of the plurality of stator laminations;
wherein each of the stator laminations in the plurality of laminations include a first set of holes, a second set of holes, and a third set of holes each of which have rectangular shapes and are positioned radially outward from a plurality of teeth in the stator lamination;
wherein each of the holes in the second set of holes and the third set of holes have an equivalent cross-sectional area;
wherein the first set of holes has a greater number of holes than a combined number of holes in the second set of holes and the third set of holes;
wherein each of the holes in the first set of holes has a greater cross-sectional area than the holes in the second set of holes and the third set of holes;
wherein the first set of holes, the second set of holes, and the third set of holes have different radial positions with regard to one another;
wherein two or more of the sequentially arranged holes have radially offset positions;
wherein the oil inlet is positioned at or near a mid-point between opposing ends of the stack of the plurality of stator laminations;
wherein a portion of the plurality of stator laminations has a smaller outer diameter than another portion of the plurality of stator laminations; and
wherein the portion of the plurality of stator laminations with the smaller diameter forms a section of the oil inlet.

11. The method of claim 10, wherein operating the oil pump to flow the oil through the plurality of oil channels includes flowing the oil from an outlet of the oil pump to the oil inlet that extends through the housing and opens into a set of the plurality of stator laminations that has a smaller diameter than a remainder of the plurality of stator laminations.

12. The method of claim 11, wherein the oil pump is at least partially incorporated into the housing.

13. The method of claim 10, further comprising flowing oil from a sump positioned below the stack of the plurality of stator laminations to an inlet of the oil pump.

14. An electric machine cooling system, comprising:
a stack of a plurality of stator laminations with a first portion of the plurality of stator laminations each including a plurality of holes that are arranged radially outward from a plurality of teeth, wherein the plurality of holes includes:
a first set of holes and a second set of holes having different areas; and
a third set of holes having a different radial position in relation to the second set of holes;
an oil inlet in fluidic communication with the plurality of oil channels and extending through a housing;
a cavity surrounding a spray ring and in fluidic communication with outlets of the plurality of oil channels; and
an opening extending through the spray ring and directing oil towards stator end windings;
wherein the first set of holes, the second set of holes, and the third set of holes each have rectangular shapes and are positioned radially outward from a plurality of teeth in the stator lamination;
wherein each of the holes in the second set of holes and the third set of holes have an equivalent cross-sectional area;
wherein each of the holes the first set of holes has a greater cross-sectional area than the holes in the second set of holes and the third set of holes;
wherein the first set of holes has a greater number of holes than a combined number of holes in the second set of holes and the third set of holes;
wherein the first set of holes, the second set of holes, and the third set of holes have different radial positions with regard to one another;
wherein oil in the plurality of oil channels flows axially outwards in opposing directions;
wherein a plurality of oil channels are formed by an alignment of holes in adjacent stator laminations in the first portion of the plurality of stator laminations;
wherein a second portion of the plurality of stator laminations has a smaller outer diameter than the first portion of the plurality of stator laminations and forms an inlet to the plurality of oil channels;
wherein the oil inlet is positioned at or near a mid-point between opposing ends of the stack of the plurality of stator laminations;
wherein a portion of the plurality of stator laminations has a smaller outer diameter than another portion of the plurality of stator laminations; and
wherein the portion of the plurality of stator laminations with the smaller diameter forms a section of the oil inlet.

15. The electric machine cooling system of claim 14, wherein the housing includes a sump that is in fluidic communication with a pump that is incorporated into the housing.

16. The electric machine cooling system of claim 14, wherein types of holes in the adjacent stator laminations that form the plurality of oil channels have a periodicity.

17. The electric machine cooling system of claim 14, wherein the plurality of holes each include at least one side that is straight.

18. The electric machine cooling system of claim 14, wherein each of the holes in the first set of holes, the second set of holes, and the third set of holes have equivalent widths.

19. The electric machine cooling system of claim 18, wherein each of the holes in the second and third sets of holes have equivalent heights.

20. The electric machine cooling system of claim 14, wherein the plurality of oil channels are positioned radially outward from stator windings.

* * * * *